(12) United States Patent
Golin et al.

(10) Patent No.: US 9,108,157 B2
(45) Date of Patent: Aug. 18, 2015

(54) EXHAUST TREATMENT DEVICE INSULATION DETECTION SYSTEM

(71) Applicant: Tenneco Automotive Operating Company Inc., Lake Forest, IL (US)

(72) Inventors: Michael Golin, Dexter, MI (US); John W. DeGeorge, Michigan Center, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 62 days.

(21) Appl. No.: 14/154,524

(22) Filed: Jan. 14, 2014

(65) Prior Publication Data

US 2015/0196877 A1 Jul. 16, 2015

(51) Int. Cl.
  *F01N 3/00* (2006.01)
  *F01N 3/10* (2006.01)
  *F01N 3/20* (2006.01)
  *F01N 3/02* (2006.01)
  *G08B 21/00* (2006.01)
  *B01D 53/94* (2006.01)
  *G01M 15/04* (2006.01)

(52) U.S. Cl.
  CPC .......... *B01D 53/9495* (2013.01); *G01M 15/048* (2013.01); *B01D 2251/2067* (2013.01)

(58) Field of Classification Search
  USPC .......... 442/59; 340/647; 60/277, 295
  See application file for complete search history.

(56) References Cited

U.S. PATENT DOCUMENTS

| 5,157,380 A | 10/1992 | Braun et al. | |
| 6,292,105 B1 * | 9/2001 | Land et al. | 340/629 |
| 2005/0208851 A1 * | 9/2005 | Gooliak | 442/59 |

* cited by examiner

*Primary Examiner* — Audrey K Bradley
*Assistant Examiner* — Dapinder Singh
(74) *Attorney, Agent, or Firm* — Harness, Dickey & Pierce, P.L.C.

(57) ABSTRACT

An exhaust after-treatment system including an exhaust passage having at least a first portion and a second portion. An exhaust treatment component may be positioned within the exhaust passage between the first and second portions, and an insulating blanket insulates each of the first portion, second portion, and the exhaust treatment component. Temperature sensors may be positioned at the first portion, the second portion, the exhaust treatment component, wherein each sensor monitors the temperature at its location. A controller may have access to temperature data associated with an insulated exhaust after-treatment system, and the controller compares the monitored temperatures to the temperature data to determine whether a difference exceeding a predetermined threshold exists. If the difference exceeds a predetermined threshold, the controller outputs an error signal identifying particular portions of the exhaust system that are no longer insulated.

19 Claims, 5 Drawing Sheets

EXHAUST TREATMENT DEVICE INSULATION DETECTION SYSTEM

FIELD

The present disclosure relates to an exhaust after-treatment system including an insulating detection system.

BACKGROUND

This section provides background information related to the present disclosure which is not necessarily prior art.

Aqueous urea exhaust treatment fluids are used to treat engine exhaust. Because the urea solution is aqueous, the urea solution is preferably atomized by dosing module when dosing into the exhaust stream to ensure conversion of the urea in the solution to ammonia and evaporation of the water. At lower temperatures, however, it can be difficult to maintain atomization of the urea solution such that the dosed urea solution may impinge on interior walls of exhaust passage. In these cases, reaction by-products may form solid deposits on interior wall of exhaust passage that can block exhaust passage.

SUMMARY

This section provides a general summary of the disclosure, and is not a comprehensive disclosure of its full scope or all of its features.

The present disclosure provides an exhaust after-treatment system for treating an exhaust produced by an engine. The exhaust after-treatment system includes an exhaust passage that is operable to receive the exhaust produced by the engine. The exhaust passage may include at least a first portion and a second portion. An exhaust treatment component may be positioned within the exhaust passage between the first and second portions. An insulating blanket insulates each of the first portion, second portion, and the exhaust treatment component. A first temperature sensor may be positioned at the first portion, a second temperature sensor may be positioned at the second portion, and a third temperature sensor may be positioned at the exhaust treatment component, wherein each sensor outputs a signal indicative of the temperature at its location. A controller may be in receipt of the signals output by the temperature sensors, and may have access to temperature data associated with an insulated exhaust after-treatment system, wherein the controller compares the signals indicative of temperature to the temperature data and determines whether a difference exceeding a predetermined threshold exists. The controller may output an error signal identifying particular portions of the exhaust system that are no longer insulated based on the difference determination.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
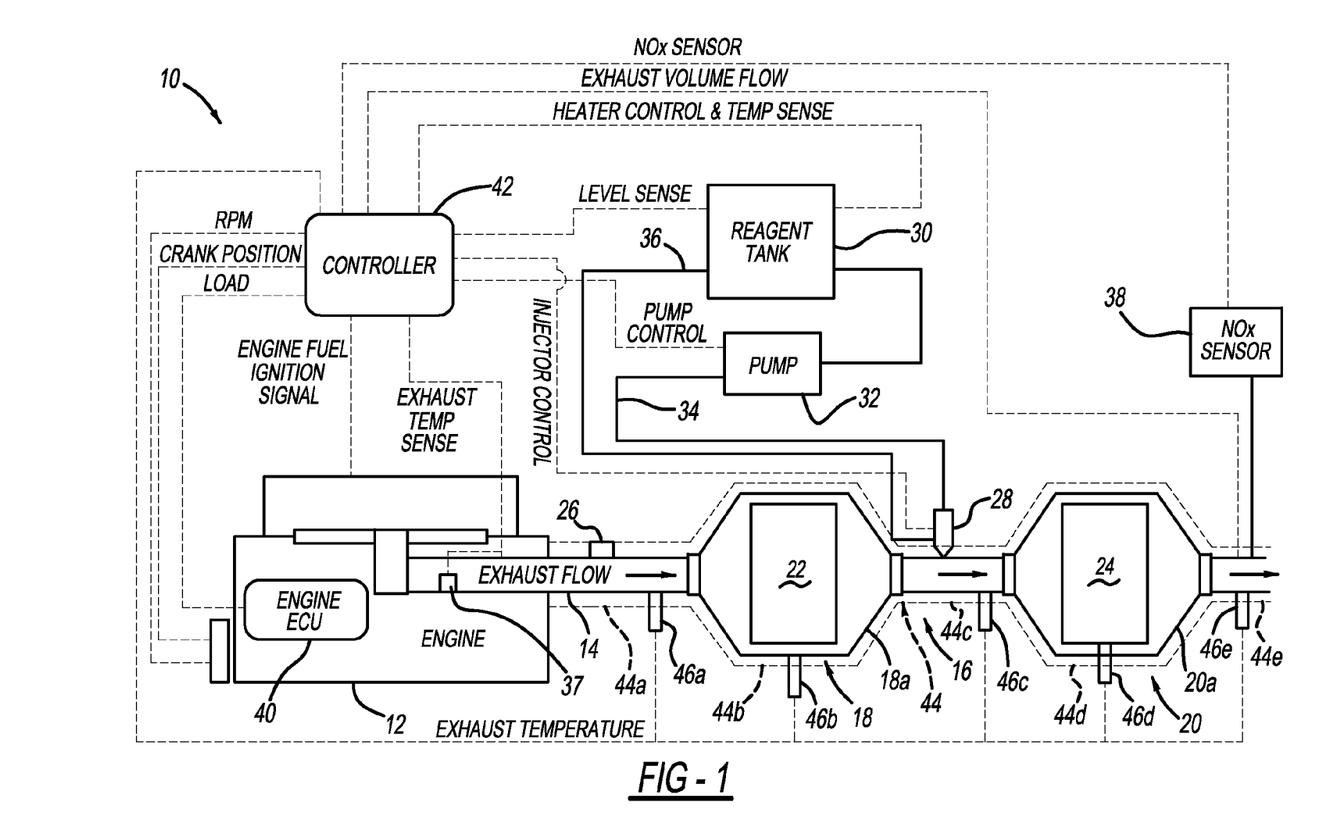
FIG. 1 is a schematic representation of an exemplary exhaust system including features according to the present disclosure.

FIG. 1 schematically illustrates an exemplary exhaust system 10 according to the present disclosure. Exhaust system 10 can include at least an engine 12 in communication with a fuel source (not shown) that, once consumed, will produce exhaust gases that are discharged into an exhaust passage 14 having an exhaust after-treatment system 16. Downstream from engine 12 can be disposed a pair of exhaust treatment components 18 and 20, which can include catalyst-coated substrates or filters 22 and 24. Catalyst-coated substrates or filters 22 and 24 can be any combination of a diesel particulate filter (DPF), a diesel oxidation catalyst (DOC), a selective catalytic reduction (SCR) component, a lean NOx catalyst, an ammonia slip catalyst, or any other type of exhaust treatment device known to one skilled in the art. If a DPF is used, it may be catalyst-coated.

Although not required by the present disclosure, exhaust after-treatment system 16 can further include components such as a thermal enhancement device or burner 26 to increase a temperature of the exhaust gases passing through exhaust passage 14. Increasing the temperature of the exhaust gas is favorable to achieve light-off of the catalyst in the exhaust treatment component 18 in cold-weather conditions and upon start-up of engine 12, as well as initiate regeneration of the exhaust treatment component 18 when the exhaust treatment substrate 22 or 24 is a DPF.

To assist in reduction of the emissions produced by engine 12, exhaust after-treatment system 16 can include a dosing module 28 for periodically dosing an exhaust treatment fluid into the exhaust stream. As illustrated in FIG. 1, dosing module 28 can be located upstream of exhaust treatment component 18, and is operable to inject an exhaust treatment fluid into the exhaust stream. In this regard, dosing module 28 is in fluid communication with a reagent tank 30 and a pump 32 by way of inlet line 34 to dose an exhaust treatment fluid such as diesel fuel or urea into the exhaust passage 14 upstream of exhaust treatment components 18 and 20. Dosing module 28 can also be in communication with reagent tank 30 via return line 36. Return line 36 allows for any exhaust treatment fluid not dosed into the exhaust stream to be returned to reagent tank 30. Flow of the exhaust treatment fluid through inlet line 34, dosing module 28, and return line 36 also assists in cooling dosing module 28 so that dosing module 28 does not overheat. Although not illustrated in the drawings, dosing module 28 can be configured to include a cooling jacket that passes a coolant around dosing module 28 to cool it.

The amount of exhaust treatment fluid required to effectively treat the exhaust stream may vary with load, engine speed, exhaust gas temperature, exhaust gas flow, engine fuel injection timing, desired $NO_x$ reduction, barometric pressure, relative humidity, EGR rate and engine coolant temperature. To monitor these variables, exhaust system 10 can include, for example, a first temperature sensor 37 operable to output a signal indicative of an exhaust temperature. The signal output by first temperature sensor 37 can act as a baseline signal that allows controller 42 to begin dosing of the exhaust treatment fluid if the measured temperature is greater than a predetermined threshold (e.g., 150 C). If the baseline signal is not indicative of the minimum temperature allowed for dosing, controller 42 will not allow dosing module 28 to dose exhaust treatment fluid into the exhaust stream.

Other exemplary sensors include a $NO_x$ sensor or meter 38 that may be positioned downstream from exhaust treatment component 18. $NO_x$ sensor 38 is operable to output a signal indicative of the exhaust $NO_x$ content to an engine control unit 40. All or some of the engine operating parameters may be supplied from engine control unit 40 via the engine/vehicle databus to an exhaust after-treatment system controller 42. Controller 42 could also be included as part of the engine control unit 40. Exhaust gas temperature, exhaust gas flow and exhaust back pressure and other vehicle operating parameters may be measured by respective sensors, as indicated in FIG. 1.

The amount of exhaust treatment fluid required to effectively treat the exhaust stream can also be dependent on the size of the engine 12. In this regard, large-scale diesel engines used in locomotives, marine applications, and stationary applications can have exhaust flow rates that exceed the capacity of a single dosing module 28. Accordingly, although only a single dosing module 28 is illustrated for dosing exhaust treatment fluid, it should be understood that multiple dosing modules 28 for reagent injection are contemplated by the present disclosure.

Exhaust after-treatment system 16 may be wrapped in an insulating blanket 44. Insulating blanket 44 may include a plurality of sections 44a, 44b, 44c, 44d, and 44e that wrap various portions of exhaust after-treatment system 16. For example, section 44a may be used to insulate exhaust passage 14 at a position located between engine 12 and first exhaust treatment component 18; section 44b may be used to insulate first exhaust treatment component 18; section 44c may be used to insulate exhaust passage 14 at a position located between first and second exhaust treatment components 18 and 20; section 44d may be used to insulate second exhaust treatment component 20; and section 44e may be used to insulate exhaust passage 14 at a position downstream from second exhaust treatment component 20. Sections 44a to 44e may be integral. Alternatively, sections 44a to 44e may be removably coupled to each other using various fastening mechanisms including zippers, hooks and eyelets (not shown), or any other fastening mechanisms known to one skilled in the art. Removably coupling sections 44a to 44e to each other allows various portions of exhaust after-treatment system 16 to be serviced, without entirely removing insulating blank 44.

Insulating blanket 44 assists in preventing heat from escaping exhaust after-treatment system 16. Insulating blanket 44, therefore, may be formed of a heat-shielding or heat-reflecting material, or may be formed from a fiberglass or mat material. It should be understood that any type of insulating material may be used, without limitation. By preventing heat from escaping exhaust after-treatment system 16, the catalysts of exhaust treatment components 18 and 20 can more effectively treat exhaust produced by engine 12 to remove various emissions from the exhaust stream.

Further, preventing heat from escaping exhaust after-treatment system 16 also assists in maintaining atomization of the reagent exhaust treatment fluid after being dosed into the exhaust stream by dosing module 28. By maintaining atomization of the reagent exhaust treatment fluid, the formation of deposits on interior walls of exhaust passage 14 can be prevented, or at least substantially minimized.

Figure 2:
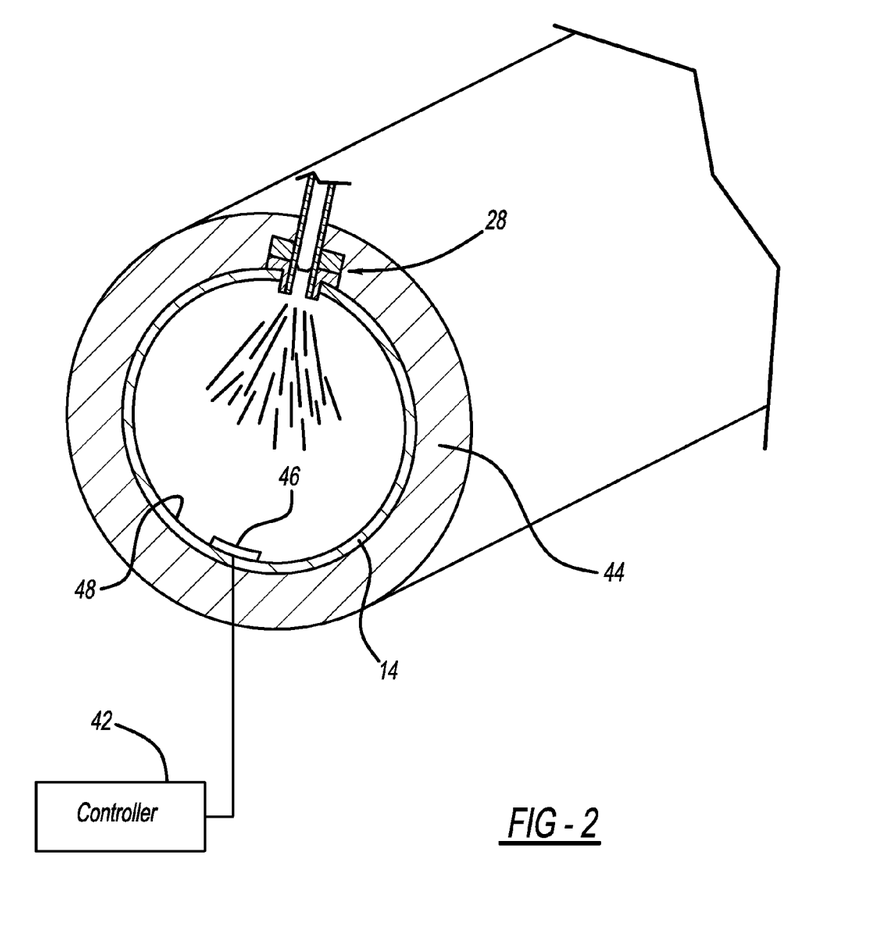
FIG. 2 is a perspective cross-sectional view of a portion of an exhaust passage according to a principle of the present disclosure.

Exhaust after-treatment system 16 may include a plurality of second temperature sensors 46. Second temperature sensors 46 may be thermocouples, thermistors, or any other type of temperature sensor known to one skilled in the art. Second temperature sensors 46 may be located at various positions along exhaust after-treatment system 16, and are used to monitor a temperature of the exhaust gases within exhaust after-treatment system 16. FIG. 2 illustrates a portion of exhaust passage 14 including a temperature sensor 46 in communication with an interior 48 of exhaust passage 14 for monitoring exhaust temperatures.

As shown in FIG. 1, the "second" temperature sensors include a temperature sensor 46a that may be coupled to exhaust passage 14 at a location between engine 12 and first exhaust treatment component 18; a temperature sensor 46b that may be coupled to a housing 18a of first exhaust treatment component 18; a temperature sensor 46c that may be coupled to exhaust passage 14 at a location between first exhaust treatment component 18 and second exhaust treatment component 20; a temperature sensor 46d that may be coupled to a housing 20a of second exhaust treatment component 20; and a temperature sensor 46e may be coupled to exhaust passage 14 at a location downstream from second exhaust treatment component 20. Each second temperature sensor 46a to 46e may communicate with controller 42 or ECU 40.

Although the use of second temperature sensors 46a to 46e is preferable, it should be understood that only exhaust treatment components 18 and 20 may include temperature sensors 46b and 46d, respectively. Alternatively, the present disclosure contemplates that only second temperature sensors 46a, 46c, and 46e may be used at positions upstream and downstream from the respective first and second exhaust treatment components 18 and 20 to monitor the exhaust temperature as the exhaust stream enters and exits each component. Another alternative is that only second temperature sensor 46c is utilized at a location proximate dosing module 28. Regardless, it should be understood that any number of second temperature sensors 46 may be used without departing from the scope of the present disclosure.

Figure 3:
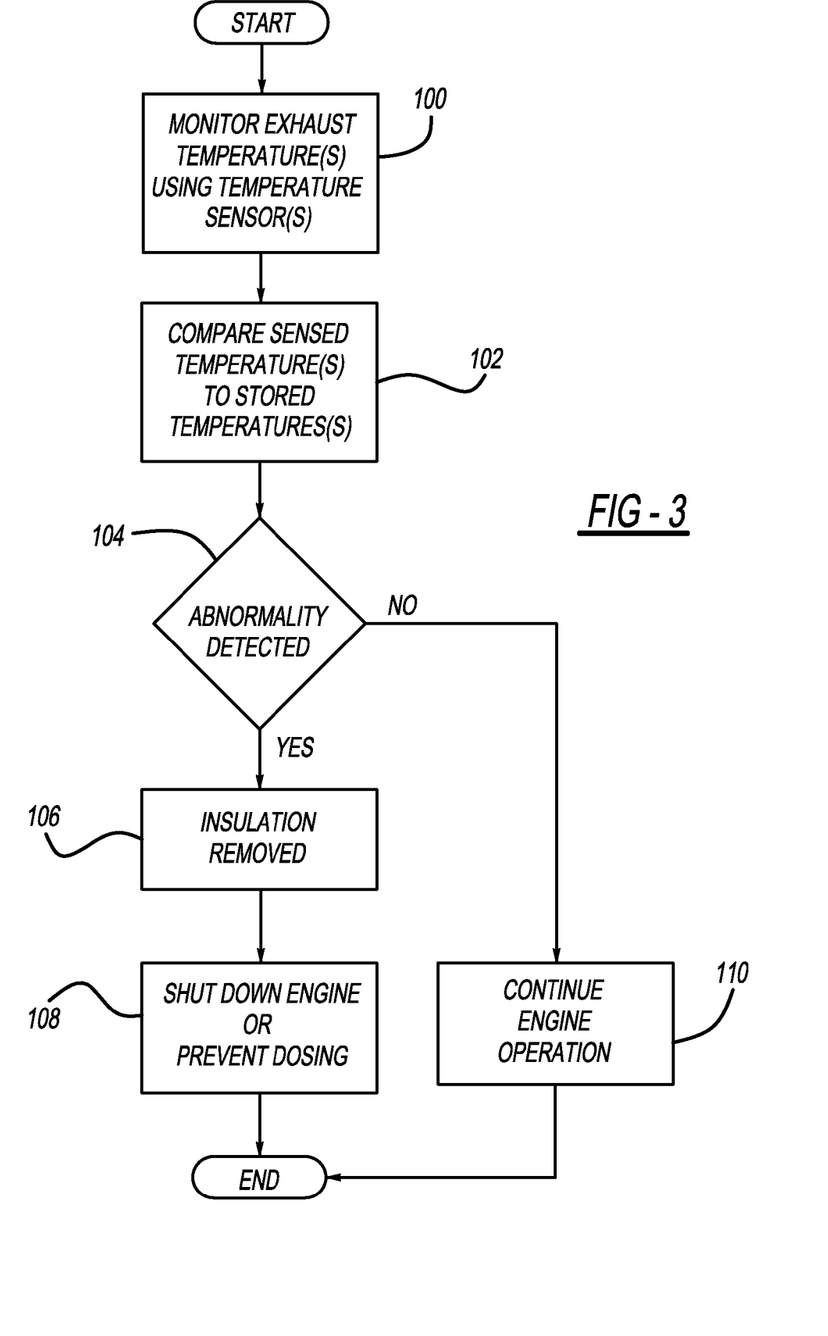
FIG. 3 is a flow-chart exemplifying a control methodology according to a principle of the present disclosure.

In addition to monitoring a temperature of the exhaust stream at various location of exhaust after-treatment system 16, second temperature sensors 46a to 46e may be used to monitor whether insulating blanket 44, or any section 44a to 44e thereof, has been removed from exhaust after-treatment system 16. FIG. 3 illustrates an exemplary control algorithm used to determine whether insulating blanket 44, or any section 44a-44e thereof, has been removed.

At control block 100, controller 42 or ECU 40 requests second temperature sensors 46a to 46e to monitor a temperature of the exhaust stream. After receiving signals indicative of the temperatures from each temperature sensor 46a to 46e, controller 42 or ECU 40 can compare the signals indicative of the measured temperatures to various temperatures that may be stored in a look-up-table in either controller 42 or ECU 40 (control block 102). The stored temperatures can be based on known exhaust temperatures at various engine loads for an insulated exhaust after-treatment system. If any of the measured temperatures in each section 44a to 44e are outside a predetermined range, controller 42 or ECU 40 can determine that an abnormality has occurred (control block 104). Alternatively, controller 42 or ECU 40 can compare the measured temperatures to a single stored temperature, and if a difference between these temperatures is greater than a predetermined threshold, controller 42 or ECU 40 can determine that an abnormality has occurred. In either case, controller 42 or ECU 40 can then infer that insulating blanket 44, or a section 44a to 44e thereof, has been removed (control block 106). Table 1 (below) is an exemplary look-up-table stored in controller 42 or ECU 40.

TABLE 1

| Section | High Engine Load | Moderate Engine Load | Low Engine Load |
| --- | --- | --- | --- |
| 44a | 500-600 C. | 350-400 C. | 300-350 C. |
| 44b | 450-500 C. | 300-325 C. | 250-300 C. |
| 44c | 400-450 C. | 275-300 C. | 200-250C. |
| 44d | 350-400 C. | 250-275 C. | 175-200 C. |
| 44e | 325-350 C. | 225-250 C. | 150-175 C. |

In this regard, if insulating blanket 44 or a section 44a to 44e thereof has been removed, the temperature measured by a particular temperature sensor 46a-46e will be lower due to the loss of heat from exhaust after-treatment system 16. The loss of heat from a particular location could be the result of insulating blanket 44 degradation, or from the removal of a section 44a to 44e of insulating blanket 44 during a service procedure, which was not replaced after the procedure. Regardless, when a temperature abnormality is detected (block 104), controller 42 or ECU 40 may output an error signal that identifying the location that is no longer insulated, signal engine 12 to cease operation, or prevent dosing module 28 from dosing exhaust treatment fluid into the exhaust stream (control block 108). By signaling an error, ceasing operation of engine 12, or by preventing dosing of exhaust treatment fluid into the exhaust stream, deposits within exhaust passage 14 or on exhaust treatment components 18 and 20 can be prevented, or at least substantially minimized. After insulating blanket 44 or sections 44a to 44e are repaired or replaced, operation of engine 12 can be re-started or dosing can be resumed. If no abnormality is detected, engine 12 and dosing module 28 may continue operation (control block 110).

It should be understood that in large-scale engine applications such as marine, stationary, and locomotive applications, the amount of exhaust produced by engine 12 can be substantial, which can require a substantial amount of reagent exhaust treatment fluid to treat the exhaust. As such, if insulating blanket 44, or a section 44a to 44e thereof, has been removed, the loss of heat from exhaust after-treatment system 16 at a particular location can be substantially greater than at other locations of the exhaust system. In these cases, the reagent exhaust treatment fluid may not remain properly atomized and may form deposits within exhaust treatment passage 14. Because such a large amount of reagent exhaust treatment fluid is needed in large-scale engine applications, the build-up of these deposits can occur fairly quickly, which may result in the build-up of backpressure that prevents optimal operation of engine 12. Further, the deposit build-up may necessitate a reduction in engine operating time due to the need to remove the deposits from the exhaust after-treatment system 16. Accordingly, by monitoring the exhaust temperature to determine whether the exhaust after-treatment system 16 is properly insulated, the amount of time needed to service exhaust after-treatment system 16 can be reduced.

Figure 4:
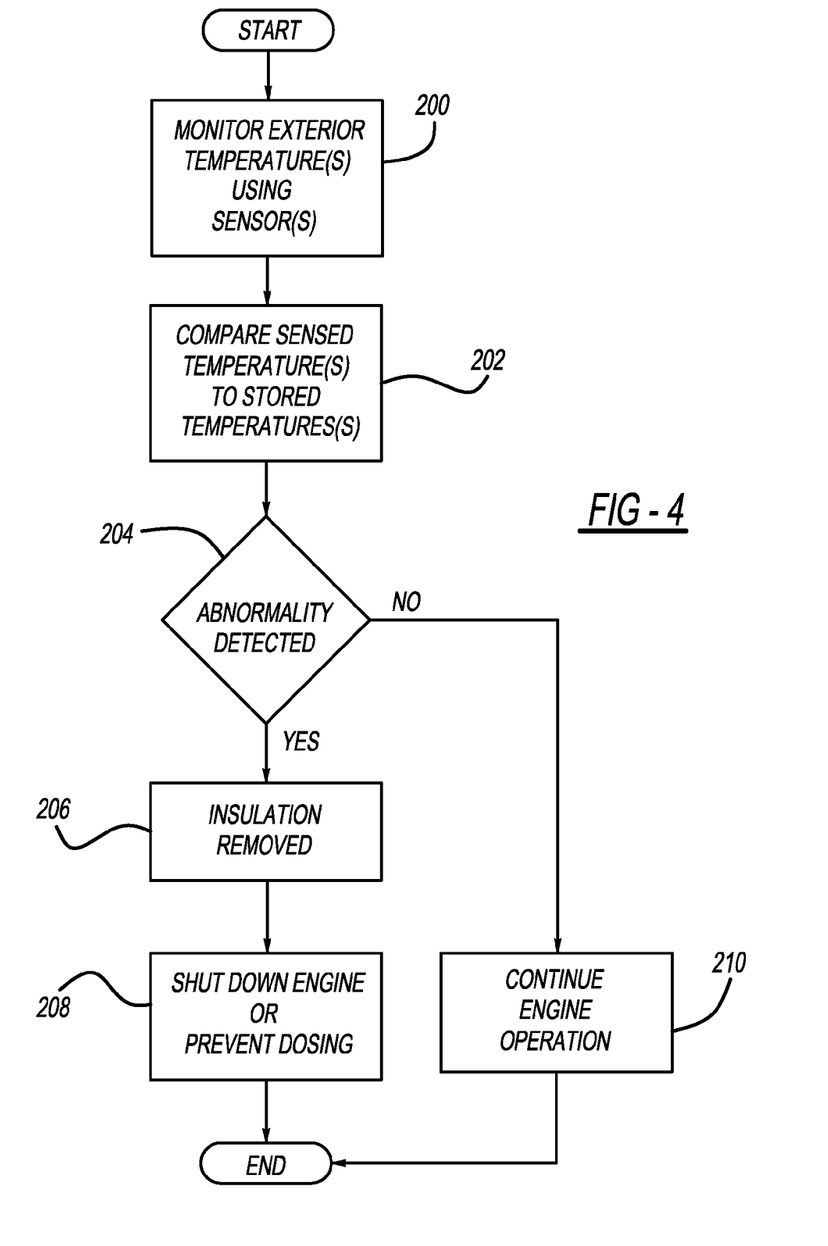
FIG. 4 is a flow-chart exemplifying another control methodology according to a principle of the present disclosure.
Figure 5:
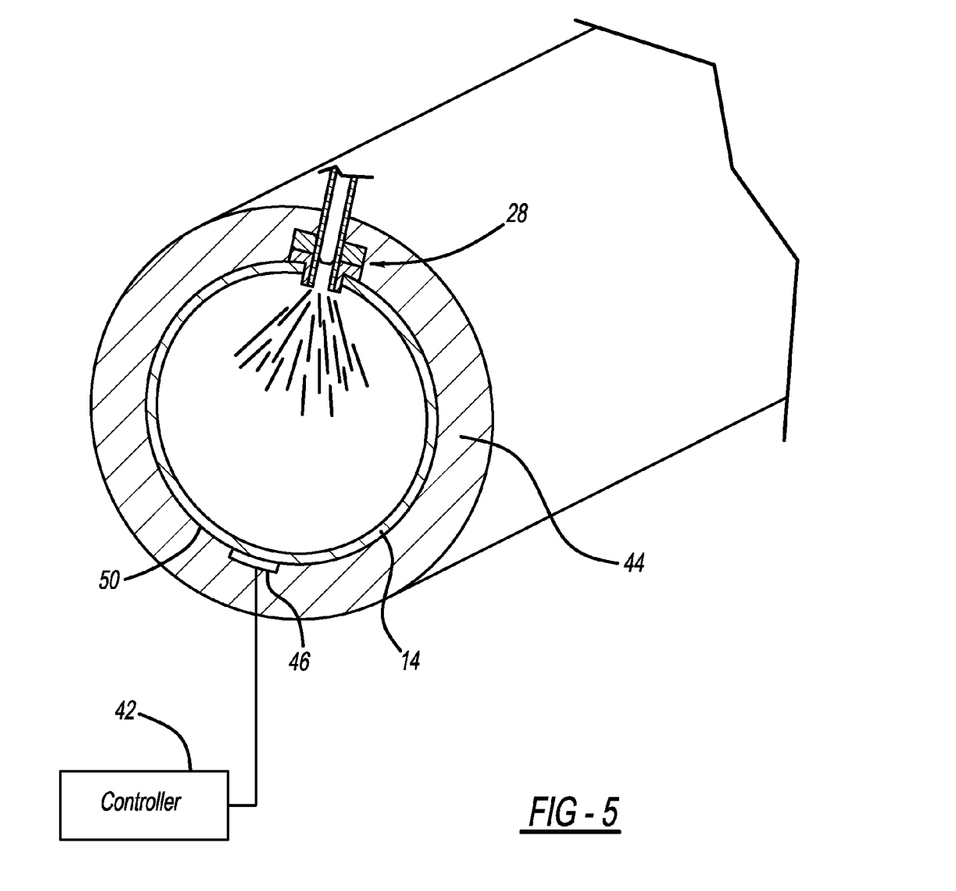
FIG. 5 is a perspective cross-sectional view of a portion of an exhaust passage according to another principle of the present disclosure.

FIG. 4 illustrates another exemplary control algorithm used to determine whether insulating blanket 44, or any section 44a-44e thereof, has been removed. In the control algorithm of FIG. 4, it should be understood that each temperature sensor 46a to 46e does not monitor a temperature of the exhaust stream as shown in FIG. 2. Rather, each temperature sensor 46a to 46e is merely coupled to an exterior 50 of exhaust passage 14 or housings 18a and 20a of the exhaust treatment components 18 and 20. Specifically, as shown in FIG. 5, each temperature sensor 46a to 46e may be disposed between insulating blanket 44 and the exterior 50 of exhaust passage 14 or housings 18a and 20a.

At control block 200, controller 42 or ECU 40 requests each temperature sensor 46a and 46e to monitor a temperature at the particular location where each temperature sensor 46a to 46e is located. After receiving measured temperatures from each temperature sensor 46a to 46e, controller 42 or ECU 40 can compare each of the measured temperatures to each other (control block 202). If any of the measured temperatures are outside a predetermined range (e.g., 25-50 degrees C. less than the other measured temperatures), controller 42 or ECU 40 can determine that an abnormality has occurred (control block 204). Controller 42 or ECU 40 can then infer that insulating blanket 44, or a section 44a to 44e thereof, has been removed (control block 206).

In this regard, if insulating blanket 44 or a section 44a to 44e thereof has been removed, the temperature measured by a particular temperature sensor 46a-46e will be lower due to the loss of heat from exhaust after-treatment system 16. The loss of heat from a particular location could be the result of insulating blanket 44 degradation, or from the removal of a section 44a to 44e of insulating blanket 44 during a service procedure. Regardless, when a temperature abnormality is detected (control block 204), controller 42 or ECU 40 may signal engine 12 to cease operation, or preventing dosing of the reagent exhaust treatment fluid by dosing module 28 into the exhaust stream (control block 208). By ceasing operation of engine 12, or by preventing dosing, the build-up of deposits within exhaust passage 14 or on exhaust treatment components 18 and 20 can be prevented, or at least substantially minimized. After insulating blanket 44 or sections 44a to 44e are repaired or replaced, operation of engine 12 can be re-started or engine load can be increased. If no abnormality is detected, engine 12 and dosing module 28 may continue operation (control block 210).

It should be understood that even though first temperature sensor 37 may output a signal indicative of a temperature above the predetermined threshold allowed for dosing exhaust treatment fluid, the signals output by second temperature sensors 46a to 46e may still be used to prevent dosing of the exhaust treatment fluid. In this regard, even though the temperature sensed by first temperature sensor 37 is above the predetermined threshold for dosing, the exhaust temperature downstream from first temperature 37 can vary. Accordingly, if second temperature sensors 46a to 46e identify a temperature anomaly, controller 42 may shut down engine 12 or prevent dosing by dosing module 28 despite the temperature detected by first temperature sensor 37 being above the predetermined threshold.

Alternatively, based on signals output by second temperatures sensors 46a to 46e, controller 42 may instruct exhaust after-treatment system 16 to operate in a by-pass mode. More specifically, many marine exhaust after-treatment systems may be equipped with a by-pass passage (not shown) that allows for the engine exhaust to escape into the atmosphere without first passing through after-treatment system 16. If an anomaly is detected by any of second temperature sensors 46a to 46e, controller 42 can shut down after-treatment system 16 and control a valve (not shown) that allows the exhaust to enter the by-pass and exit into the atmosphere.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust after-treatment system for treating an exhaust produced by an engine, comprising:
an exhaust passage that is operable to receive the exhaust produced by the engine, the exhaust passage including at least a first portion and a second portion;
an exhaust treatment component positioned within the exhaust passage between the first and second portions;
an insulating blanket operable to insulate each of the first portion, second portion, and the exhaust treatment component;
a first temperature sensor positioned at the first portion, a second temperature sensor positioned at the second portion, and a third temperature sensor positioned at the exhaust treatment component, wherein each sensor outputs a signal indicative of the temperature at its location; and
a controller in receipt of the signals output by the temperature sensors and having access to temperature data associated with an insulated exhaust after-treatment system,
wherein the controller compares the signals indicative of temperature to the temperature data and determines whether a difference exceeding a predetermined threshold exists, the controller outputting an error signal identifying particular portions of the exhaust system that are no longer insulated based on the difference determination.

2. The exhaust after-treatment system of claim 1, wherein the temperature sensors are in communication with the exhaust, and the signals output by the temperature sensors are indicative of exhaust temperatures.

3. The exhaust after-treatment system of claim 1, wherein the insulating blanket includes a plurality of sections, and the controller is operable to identify if any of the plurality of sections is removed or degraded.

4. The exhaust after-treatment system of claim 1, wherein the first temperature sensor is positioned between an exterior of the first portion and the insulating blanket, the second temperature sensor is positioned between an exterior of the second portion and the insulating blanket, and the third temperature sensor is positioned between an exterior of the exhaust treatment component and the insulating blanket.

5. The exhaust after-treatment system of claim 4, wherein the signals output by the temperature sensors are indicative of exterior temperatures of the exteriors of the first portion, the second portion, and the exhaust treatment component.

6. The exhaust after-treatment system of claim 1, further comprising a dosing module for dosing an exhaust treatment fluid into the exhaust.

7. The exhaust after-treatment system of claim 6, wherein the dosing module is positioned at the first portion, at a location upstream from the exhaust treatment component.

8. An engine exhaust after-treatment system, comprising:
an exhaust passage;
an exhaust treatment component in communication with the exhaust passage;
a dosing module for dosing an exhaust treatment fluid into the exhaust passage at a location upstream from the exhaust treatment component;
an insulating blanket disposed about the exhaust passage at least at the location;
a temperature sensor proximate the location for outputting a signal indicative of a temperature at the location; and
a controller in receipt of the signal output by the temperature sensor and having access to temperature data associated with an insulated exhaust after-treatment system,
wherein the controller compares the signal indicative of the temperature to the temperature data and determines whether the signal is outside of a predetermined range, the controller outputting an error signal identifying that the location is no longer insulated based on the determination.

9. The engine exhaust after-treatment system of claim 8, wherein the temperature sensor is in communication with the engine exhaust, and the signal is indicative of an engine exhaust temperature.

10. The engine exhaust after-treatment system of claim 8, wherein the temperature sensor is positioned between an exterior of the exhaust passage and the insulating blanket, and the signal is indicative of a temperature of the exhaust passage.

11. The engine exhaust after-treatment system of claim 8, wherein the insulating blanket includes a plurality of sections, and the controller is operable to identify if any of the plurality of sections is removed or degraded.

12. The engine exhausts after-treatment system of claim 8, wherein the controller is in communication with the dosing module, and if the signal is outside of the predetermined range, the controller instructs the dosing module to at least reduce dosing the exhaust treatment fluid.

13. The engine exhaust after-treatment system of claim 8, wherein the controller is in communication with the dosing module, and if the signal is outside of the predetermined range, the controller instructs the dosing module to cease dosing the exhaust treatment fluid.

14. A method for monitoring an exhaust after-treatment system that includes an exhaust passage, a dosing module for dosing an exhaust treatment fluid into the exhaust passage, an insulating blanket disposed about the exhaust passage at a position proximate the dosing module, and a temperature sensor, the method comprising:
outputting a signal indicative of a temperature of the exhaust passage proximate the dosing module or a temperature of the exhaust at a location proximate the dosing module with the temperature sensor;
comparing the signal indicative of the temperature with a stored temperature of an insulated exhaust after-treatment system;
after comparing the signal and stored temperature, determining whether a difference exceeding a predetermined threshold exists;
outputting an error signal identifying that the location is no longer insulated based on the difference determination; and
changing the dosing of the exhaust treatment fluid if the signal is outside of a predetermined range.

15. The method of claim 14, wherein the temperature sensor is in communication with the engine exhaust, and the signal is indicative of an engine exhaust temperature.

16. The method of claim 14, wherein the temperature sensor is positioned between an exterior of the exhaust passage and the insulating blanket, and the signal is indicative of a temperature of the exhaust passage.

17. The method of claim 14, wherein the insulating blanket includes a plurality of sections, and the controller is operable to identify if any of the plurality of sections is removed or degraded.

18. The method of claim 14, wherein the controller is in communication with the dosing module, and if the signal is outside of the predetermined range, the controller instructs the dosing module to at least reduce dosing the exhaust treatment fluid.

19. The method of claim 14, wherein the controller is in communication with the dosing module, and if the signal is outside of the predetermined range, the controller instructs the dosing module to cease dosing the exhaust treatment fluid.

* * * * *